United States Patent [19]

Veeneman et al.

[11] Patent Number: 5,243,174
[45] Date of Patent: Sep. 7, 1993

[54] METHOD AND APPARATUS FOR GENERATING GIFT CERTIFICATES

[75] Inventors: William J. Veeneman; Thomas J. Doyle, both of Minneapolis; Karla J. Alexander, Minnetonka; Robert H. Hamilton, Edina, all of Minn.

[73] Assignee: The Gift Certificate Center, Inc., Minneapolis, Minn.

[21] Appl. No.: 664,930

[22] Filed: Mar. 5, 1991

[51] Int. Cl.$^5$ .............................................. G06F 7/08
[52] U.S. Cl. .................................. 235/381; 364/479; 902/30
[58] Field of Search ............... 235/379, 381, 382, 383; 364/408, 479; 902/18, 30, 21-23, 41

[56] References Cited

U.S. PATENT DOCUMENTS

| | | | |
|---|---|---|---|
| 4,247,759 | 1/1981 | Yuris et al. | 235/381 |
| 4,359,631 | 11/1982 | Lockwood et al. | 235/381 |
| 4,704,518 | 11/1987 | Brunn et al. | 235/480 |
| 4,809,837 | 3/1989 | Hayashi | 194/205 |

Primary Examiner—John Shepperd
Assistant Examiner—Edward H. Sikorski
Attorney, Agent, or Firm—Merchant, Gould, Smith, Edell, Welter & Schmidt

[57] ABSTRACT

An electronic gift certificate dispenser device for printing and dispensing a gift certificate purchased by a credit card. A consumer approaches the device and inserts a credit card into a magnetic card reader. The consumer chooses a retailer from a menu of participating retailers and enters the gift certificate value. The machine automatically verifies the credit card, causes the account to be debited and prints the gift certificate. A plurality of gift certificate dispensing devices can be connected in a network under the control of a central processing unit. Information regarding gift certificate purchases is transferred from the devices to the central processing unit to be collated and billed to credit card accounts. The central processing unit also informs merchants of the purchase of gift certificates that will be redeemed at their stores.

14 Claims, 18 Drawing Sheets

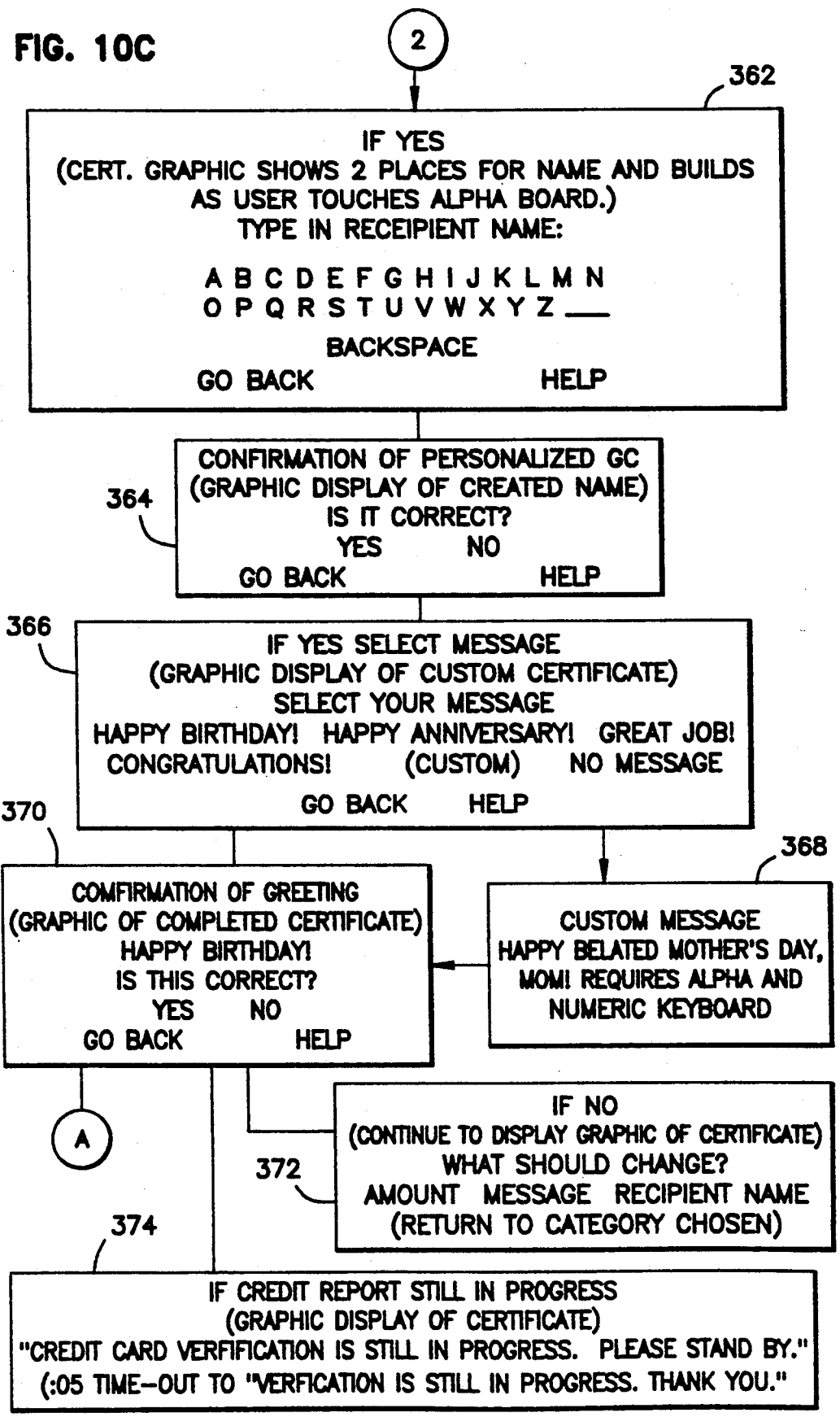

METHOD AND APPARATUS FOR GENERATING GIFT CERTIFICATES

BACKGROUND OF THE INVENTION

1. Field of the Invention

The present invention relates to an apparatus and method for dispensing gift certificates, and more particularly to an apparatus and method for vending such certificates from terminals in communication with a central processing mechanism.

2. Background of the Invention

Due to increasing time constraints in the lives of busy people, gift certificates have emerged as a viable alternative to the purchase of the gift itself. Gift certificates offer many advantages over the purchase of a gift. If the gift giver is unsure of the needs of the recipient, a gift certificate offers a wide range of goods or services from which the recipient can choose. Gift certificates also remove the hassle of exchanging a gift without a receipt.

Currently gift certificates can be purchased only at retail locations or through catalog houses. This makes the purchase of a certificate less convenient and, therefore, reduces its value to the consumer.

A similar convenience problem was recognized and addressed in the banking industry. One of the solutions was the development of Automatic Teller Machine (ATM) devices. ATMs have become popular for handling simple repetitive transactions such as the dispensing of currency. The widespread acceptance of ATMs has created an educated consumer willing to conduct transactions through a vending device accessed by a credit card.

A similar type of device has been applied to the airline ticketing industry. U.S. Pat. No. 4,818,854, issued to Davies et al. discloses an automatic ticket handling machine used for vending airline tickets. The consumer approaches the machine, inserts a credit card into the card reader, enters a ticketing request through a touch screen and receives a printed ticket. The machine automatically verifies the credit card and debits the account.

The gift certificate industry has special requirements that make development of an automatic transaction machine difficult. Gift certificates are similar to currency in their ease of use and anonymity. Steps must be taken to prevent the use of stolen credit cards in the procurement of certificates and to secure paper stock to make forging of certificates difficult.

It is apparent that there is a need for a device that can dispense gift certificates while maintaining a high level of security.

SUMMARY OF THE INVENTION

The present invention provides a device incorporating a magnetic card reader, a control mechanism and a printer for the printing and dispensing of gift certificates. The consumer approaches the device and inserts a credit card into the card reader. The consumer chooses a retailer from a menu of participating retailers and enters the gift certificate value. The machine automatically verifies the credit card, causes the credit card account to be debited and prints the gift certificate.

According to another embodiment of the present invention, a plurality of devices for printing and dispensing gift certificates are connected to a central processing unit. Each device must establish communication with the central processing unit before it can become operative. At any time after a device becomes operative, it can be rendered inoperative by command from the central processing unit.

According to yet another embodiment of the present invention, a device is disclosed for dispensing gift certificates. Users of the device enter instructions at a first wall of the device. Finished gift certificates and envelopes are delivered at slots in a second wall.

According to yet another embodiment of the present invention, a device is disclosed for dispensing gift certificates comprising a redeemable section and a receipt. The redeemable section includes a holographic foil to make counterfeiting difficult.

According to yet another embodiment of the present invention, a method is disclosed for controlling the selection and printing of gift certificates that can be used to purchase goods and services from a plurality of retail stores.

According to yet another embodiment of the present invention, a method is disclosed for controlling the selection and printing of gift certificates from a network of gift certificate dispensing terminals connected to a central processing unit.

According to yet another embodiment of the present invention, a method is disclosed for printing the gift certificate itself.

According to yet another embodiment of the present invention, a method is disclosed for controlling access to the electronics of a device used for printing and dispensing a gift certificate.

According to another aspect of the present invention, to discourage credit card fraud each device monitors credit cards used within a predetermined period and limits the total value that can be charged to a credit card within that period to a predetermined maximum value within that period.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
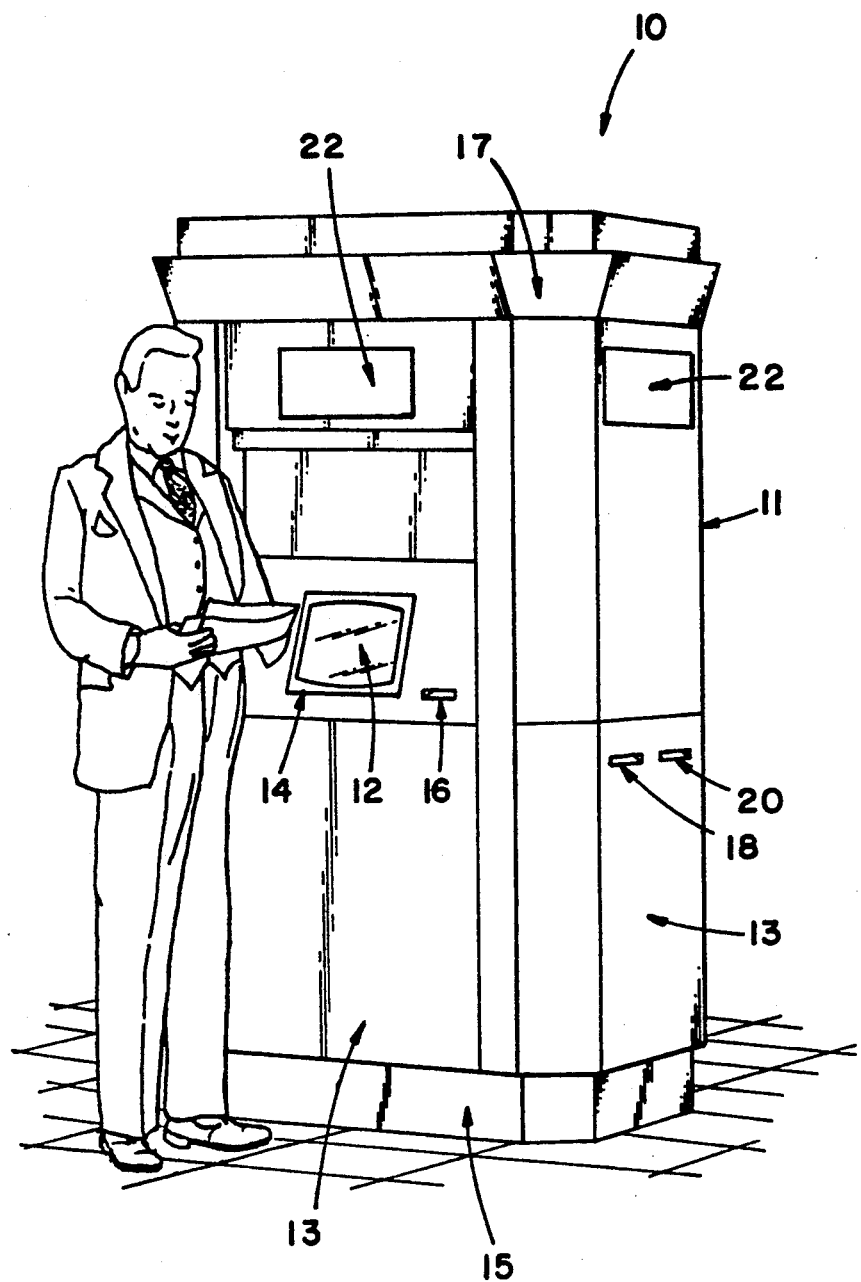
FIG. 1 is a perspective view of a gift certificate dispensing device in accord with the present invention.

An electronic gift certificate dispensing device 10 is shown in FIG. 1. Gift certificate dispensing device 10 is a stand-alone housing having a rectangular shape with panel-like walls 13, a base 15 and a top 17. Dispensing device 10 houses a monitor 12 with touch screen 14, a magnetic card reader 16, a certificate dispenser slot 18, an envelope dispenser slot 20 and identifying plaques 22 on one or more sides of the device. In the preferred embodiment plaque 22 is made of a backlit translucent material with indicia thereon. Ventilation for the interior of the housing is provided by means of a fan or air conditioner (not shown).

Monitor 12 is used to display choices given to the customer in the purchase of a gift certificate. Choices are made by the customer and entered by touching predetermined areas of touch screen 14. Card reader 16 is used to swipe a credit card in order to debit a credit card account for payment for gift certificates dispensed. It should be noted that although the preferred embodiment is geared toward the use of a credit card it should be obvious that the teaching of the present invention could easily be applied to a debit card system.

In the preferred embodiment, and as shown in FIG. 1, monitor 12, touch screen 14 and card reader 16 are mounted in a first wall of the housing of device 10. Certificate dispenser slot 18 and envelope dispenser slot 20 are mounted in a second wall of device 10. A customer will approach touch screen 14 in the first wall, enter gift certificate choices, swipe a credit card through card reader 16 and then step to the second wall to await printing and dispensing of the certificate and envelope. This allows a second customer to access touch screen 14 while the first customer is waiting for his transaction to finish.

In an alternate embodiment, a monitor 23 is provided positioned over certificate dispenser slot 18 and envelope dispenser slot 20 for displaying messages such as instructions or advertising to a person waiting for a certificate to issue.

In a second alternate embodiment, dispensing device 10 is built into a wall or like structure and covered by one or more panel-like wall portions 13 housing a card reader 16, a certificate dispenser slot 18, an envelope dispenser slot 20 and a monitor 12 with touch screen 14 mounted thereon.

Figure 2:
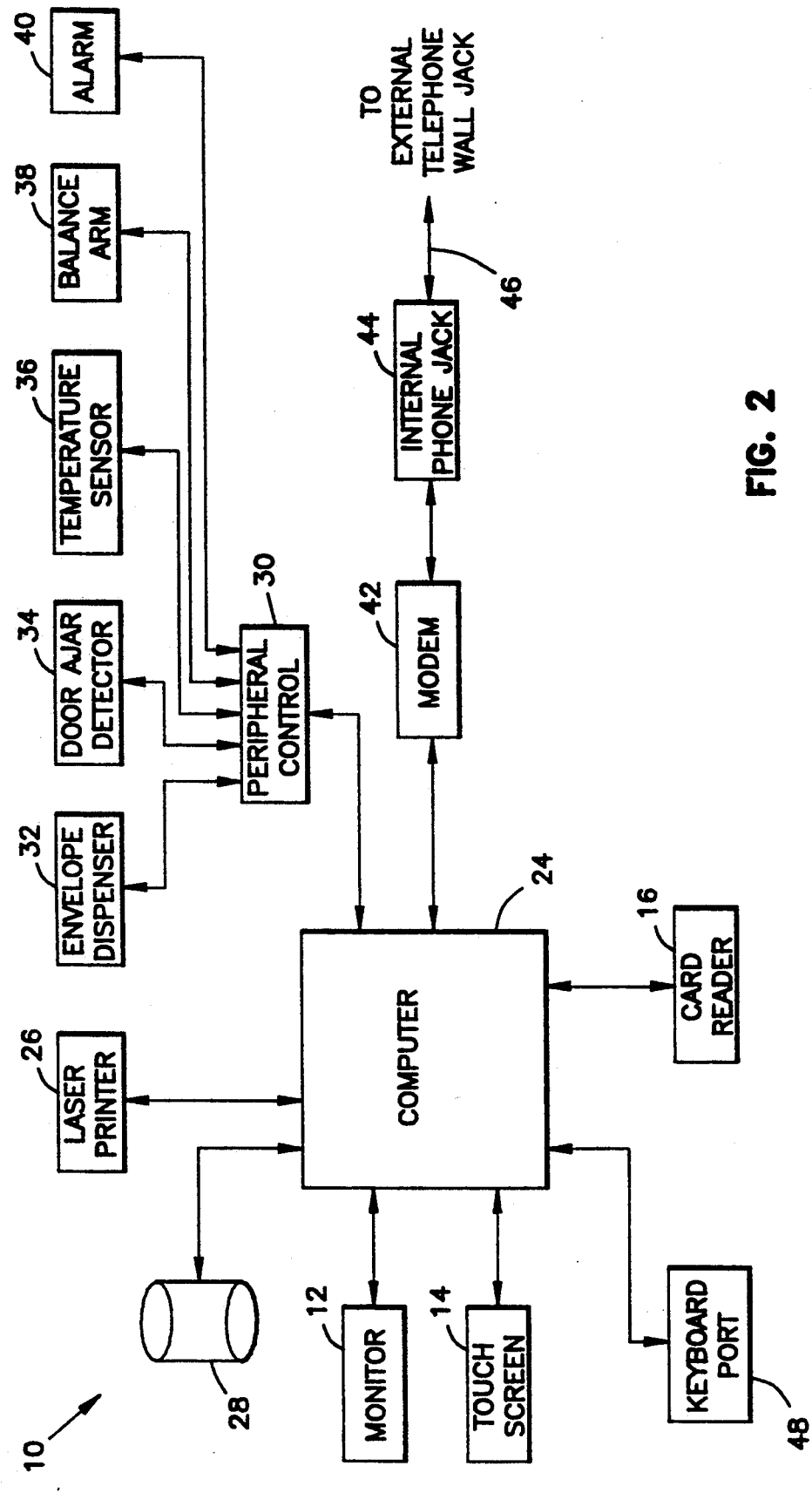
FIG. 2 is an electrical block diagram representation of the gift certificate dispensing device according to the present invention.

The various electronics which provide the advantageous features of gift certificate dispensing device 10 are secured behind an access door (not shown) in the housing of dispensing device 10. FIG. 2 shows an electrical block diagram of electronic gift certificate dispensing device 10 of FIG. 1. Computer 24 is connected to monitor 12, touch screen 14, card reader 16, laser printer 26, nonvolatile memory device 28, peripheral control device 30 and modem 42. Computer 24 is also connected to a keyboard port 48 to allow connection of a keyboard (not shown) during servicing. Peripheral control device 30 is connected to envelope dispenser 32, door ajar detector 34, temperature sensor 36, balance arm 38 and alarm 40. Peripheral control device 30 is an interface circuit with registers that receives commands from computer 24 and transmits status back to computer 24. Modem 42 is connected through internal telephone jack 44 to public telecommunications channel 46.

In the preferred embodiment, computer 24 is an IBM PC or compatible computer with at least 2 MBytes of dynamic memory. Monitor 12 is a standard VGA monitor. Touch screen 14 is a continuous capacitance touch screen with touch screen controller. Card reader 16 is a MAGTEX 21055002 slotted magnetic card reader connected to computer 24 through an RS232 line. Laser printer 26 is a Hewlett Packard Series III laser printer. Nonvolatile memory device 28 is a 40 MByte fixed disk drive. Modem 42 is a 2400 Baud MNP Level 5 error correcting modem. And telephone jack 44 is a standard jack compatible with a standard domestic telephone cable. All these items are commercially available as is known to those skilled in the art.

Card reader 16 is a typical magnetic card reader used to read coded data stored in a magnetic strip on a credit card. Credit cards typically have information such as the account name, the account number and the expiration date of the card encoded and deposited on their magnetic strip. Card readers such as card reader 16 contain circuitry which reads the encoded data and sends that data to computer 24 for use in validating the card.

Figure 3:
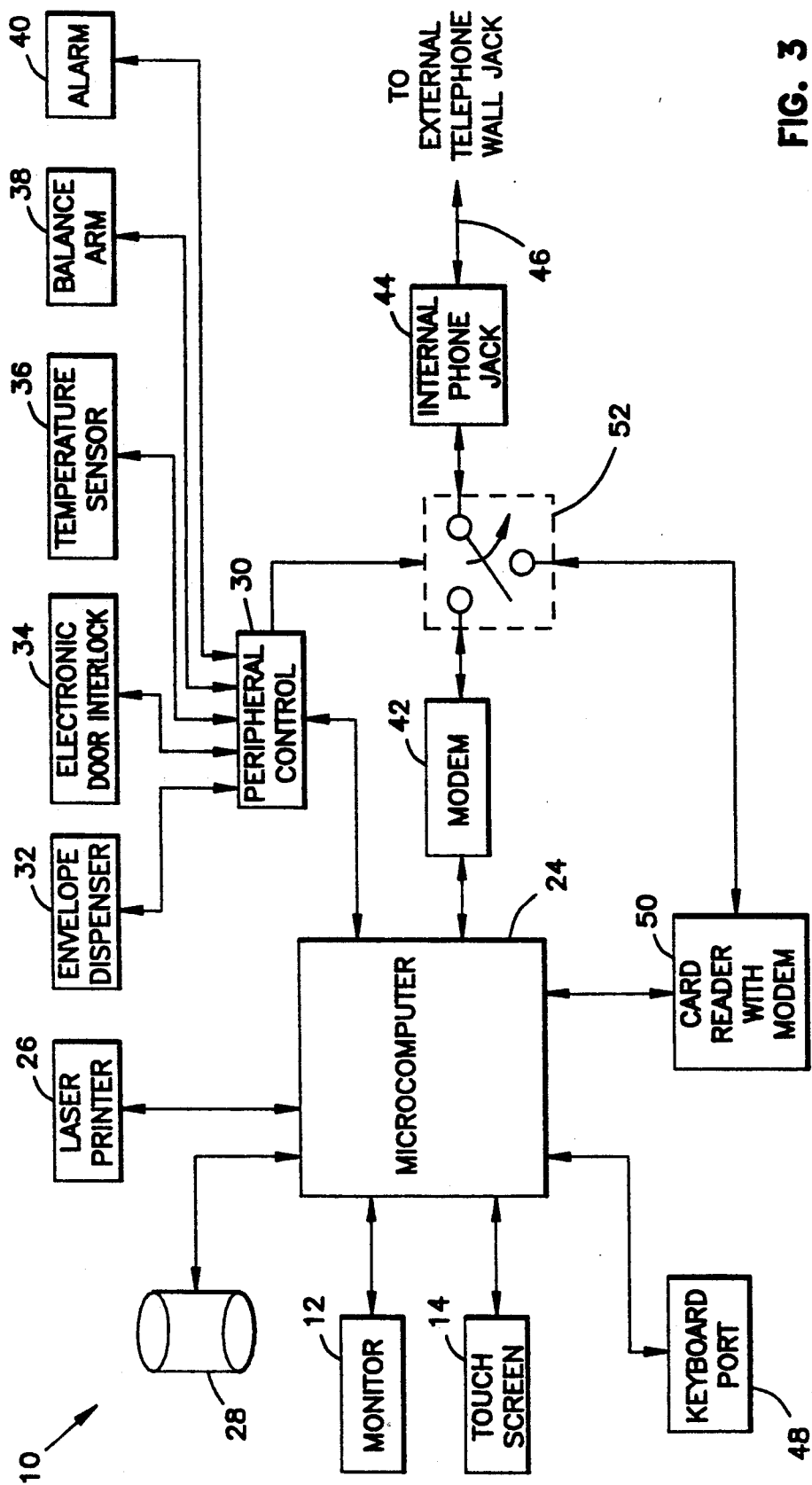
FIG. 3 is an alternative electrical block diagram representation of the gift certificate dispensing device according to the present invention.

An alternate embodiment of the electronics of gift certificate dispensing device 10 is shown in FIG. 3. In FIG. 3 a card reader 50 with integral modem is used to automatically dial a credit card service for verification of a credit card passed therethrough. A telephone switch 52 under control of peripheral control device 30 connects the modem in card reader 50 to public telecommunications channel 46. This embodiment offloads some of the processing required by computer 24 at the cost of a more expensive card reader and some commercially available switching logic.

In an yet another alternate embodiment to dispensing device 10, a monitor 54, touch screen 56 and card reader 58 are mounted on the wall 13 opposite monitor 12. Monitor 54, touch screen 56 and card reader 58 are connected to computer 24 such that a second terminal is provided for selecting and printing gift certificates. Computer 24 controls the operation of both sets of monitors, touch screens and card readers as two separate tasks. Access to common resources such as laser printer 26 and modem 42 is arbitrated by computer 24. Envelopes and printed gift certificates are still dispensed through slots 20 and 18, respectively.

In the preferred embodiment access to the electronics of dispensing device 10 is limited. Only touch screen 14 and card reader 16 are readily accessible to the user. The remainder of the electronics are secured behind the access door. Door ajar detector 34 is a switch used to detect unauthorized access to the interior of the housing and to notify computer 24 that an unauthorized access has taken place. In a like manner, balance arm 38 detects that the gift certificate dispensing device is being moved and notifies computer 24. Computer 24 can then activate alarm 40 as a first level of theft or vandalism deterrence.

Also, in the preferred embodiment, temperature sensor 36 mounted inside gift certificate dispensing device 10 measures the ambient temperature within dispensing device 10 and reports that temperature to computer 24. If the measured ambient temperature rises above 85 degrees Fahrenheit computer 24 automatically shuts down the electronics of device 10 to avoid damage to electronic components.

Gift certificate dispensing device 10 can operate independently or within a network. Networked operation of the dispensing devices is preferred since it eases the requirement for local security. In the preferred embodiment a number of gift certificate dispensing devices are connected by telephone to a main computer. The main computer can poll dispensing devices to determine if a dispensing device has been disconnected or has lost power, can execute diagnostic tests remotely to expedite detection of hardware failure and can monitor devices for unauthorized access or vandalism.

Figure 4:
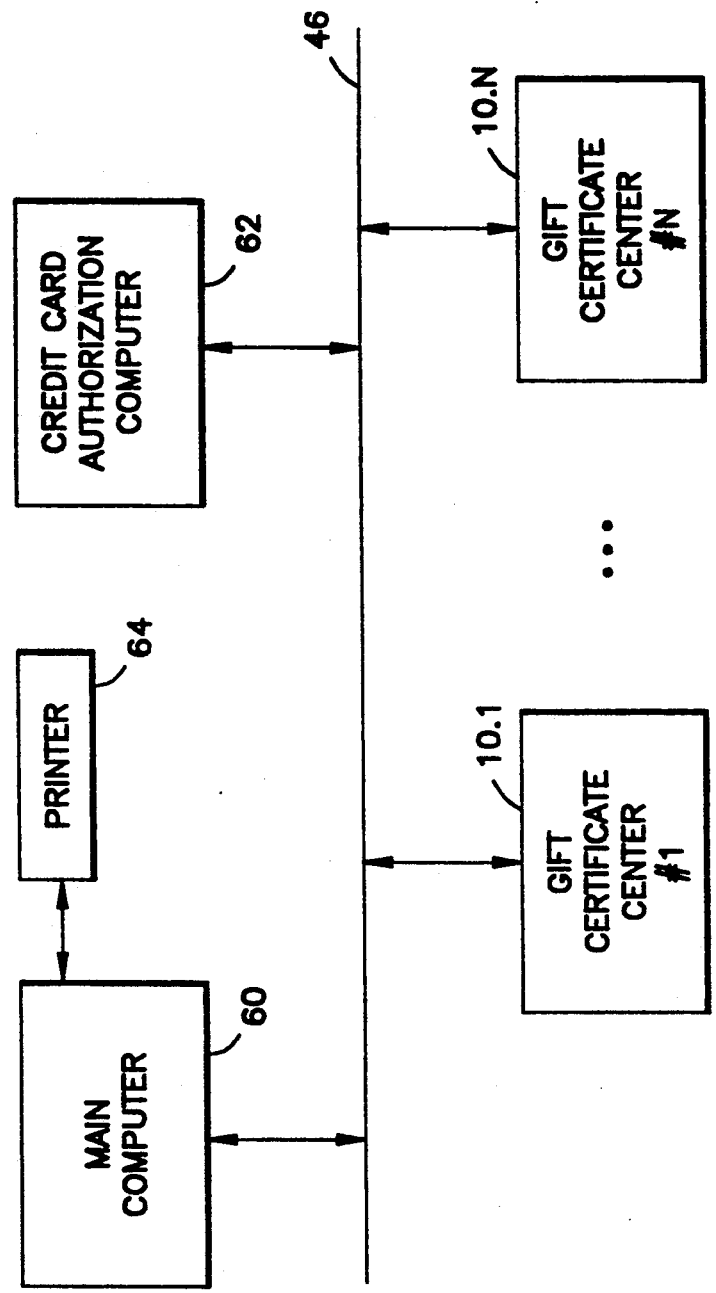
FIG. 4 is a block diagram representative of a network of gift certificate dispensing devices coordinated by a main computer and one or more credit card authorization computers according to the present invention.

FIG. 4 is a block diagram representative of a network of gift certificate dispensing devices 10 coordinated by a main computer. In FIG. 4, gift certificate dispensing devices 10.1 through 10.N are connected through public telecommunications channel 46 to main computer 60. Computer 60 is connected to a printer 64 for printing transactions either as they occur or as a batch at predetermined time intervals. Gift certificate dispensing devices 10.1 through 10.N also access one or more credit card authorization computers 62 through channel 46. In the preferred embodiment computer 60 is a PC compatible computer. Purchases made through gift certificate dispensing devices 10. 1 through 10.N are accumulated in computer 60. Requests for payment (debits to credit card accounts) for those purchases are either submitted electronically through public telecommunications channel 46 to computer 62 or submitted as a bill printed from printer 64. In a like manner, merchants are notified of purchases of gift certificates issued in their name and of the code numbers of the certificates issued either through channel 46 or through a report printed by printer 64.

Steps have been taken to ensure secure operation of gift certificate dispensing devices 10. In the preferred embodiment, device 10 powers up inoperative. In order to become operative, it must establish communication with computer 60, download a unique security code and verify that code against a code maintained in nonvolatile memory device 28.

Figure 6:
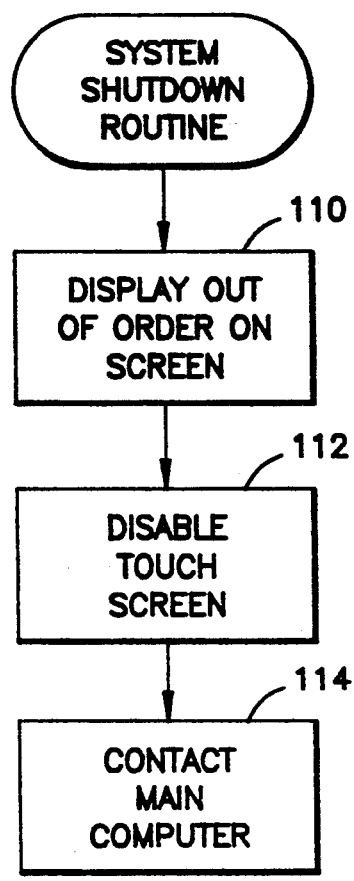
FIG. 6 is a flow chart representation of the steps taken in shutting down the system after a hard failure.

Computer 60 can at any time render any device 10 in the network inoperative by sending it a shut down command. Reception of the shut down command causes a device 10 to destroy sensitive code and data and enter a special system shut down routine that disables the user interface. A representative system shut down routine is shown in FIG. 6 and described later. This is a useful security feature that can be used to disable a device 10 when computer 60 detects a failure or impending failure.

In an alternate embodiment, critical code and data needed for operation could be stored in computer 60 and downloaded as part of initialization.

Security is considered to be breached if door ajar detector 34 or balance arm 38 of gift certificate dispensing device 10 are tripped. In the preferred embodiment an alarm 40 is triggered and data within computer 24 related to printing of gift certificates 200 is erased. Once the data is erased the system can be brought back up only by authorized personnel with the appropriate codes. If the dispensing device is part of a network, computer 24 calls main computer 60 and reports the trouble. If desired, main computer 60 could restore device 10 by initializing the device as described above and downloading the appropriate data.

Detector 34 and balance arm 38 can be disabled by entering an access code at touch screen 14. This allows authorized personnel to gain access to device 10 for repair and maintenance.

Gift certificates are printed with an intricate multicolored design on faded parchment paper and embossed with holographic foil. The type of paper, the ink and the amount of detail are chosen to make copying difficult. Embossing the certificate with holographic foil makes counterfeiting more difficult. In the preferred embodiment, the paper used is a 70 pound Cougar (smooth offset) opaque which may be obtained from Midwest Business Forms, West St. Paul, Minn. The holographic foil may be obtained from and applied by Larkin Industries, St. Paul, Minn.

Figure 12:
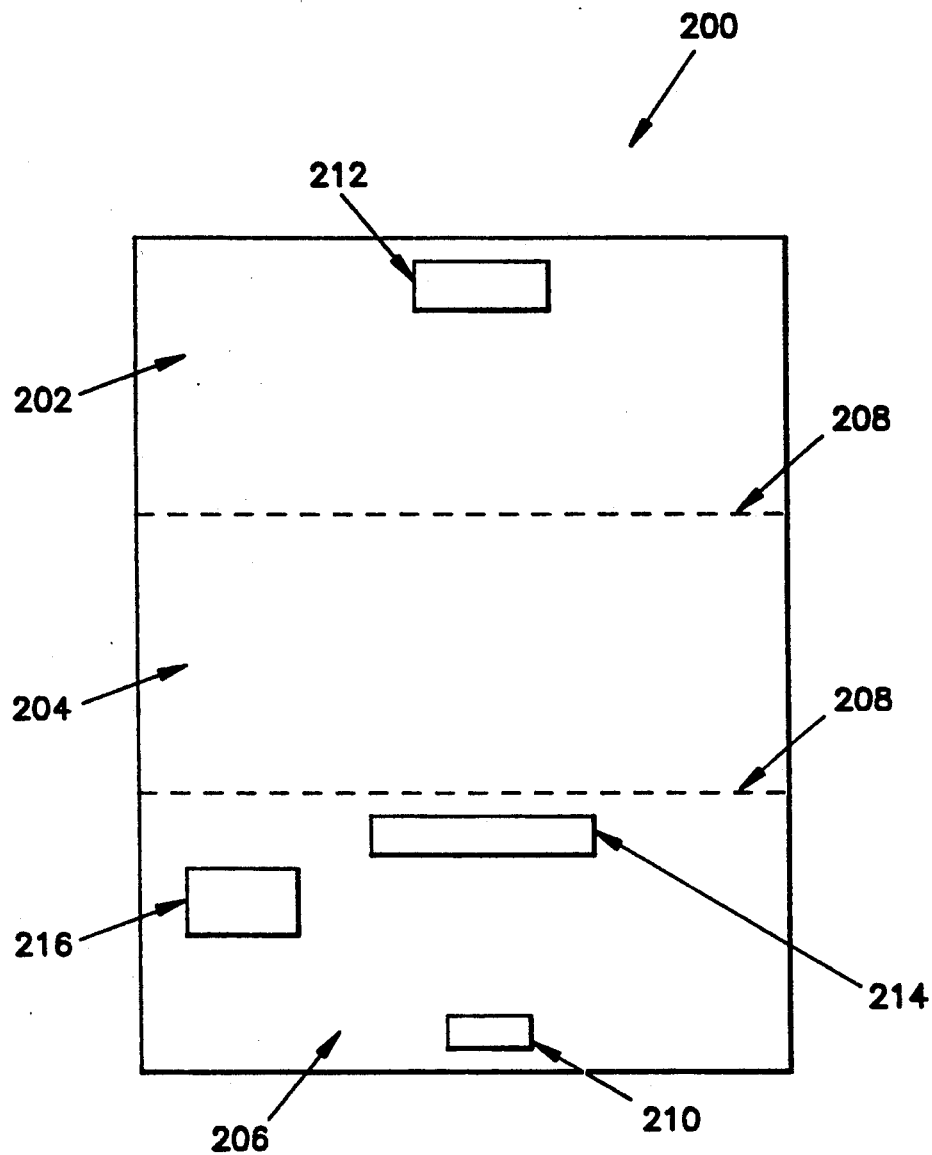
FIG. 12 is a representation of a gift certificate in accord with the present invention.

A representative gift certificate is shown in FIG. 12. Gift certificate 200 is a standard size sheet of faded parchment paper divided into three sections 202, 204 and 206 with perforations 208 for easy separation of the sections. Section 202 is used to print a receipt for the transaction. The name and account number on the credit card is printed along with name of the recipient, the date, the charges for the purchase and the dispensing device 10 from which the certificate was purchased. In the preferred embodiment, a service charge per certificate is included in the total charges. Section 204 is used to display the name of the intended recipient, a message such as "Happy Birthday" or "Thank You" and the name of the purchaser. Section 206 is the section of the gift certificate that is redeemed to purchase merchandise from the intended retailer.

In the preferred embodiment, during production each section 206 is imprinted in magnetic ink with a unique control code (not shown) and silver embossed with a hologram 210. The code imprinted is matched to the name of the intended recipient during the sale of the certificate and the code and the name of the recipient are then communicated to the intended retailer. When the certificate is redeemed the code can be compared against a list of expected codes and verified for authenticity. In an alternate embodiment, the control code could be implemented as a bar code that can be scanned with a bar code reader.

A logo representative of the company operating the particular gift certificate dispensing device 10 is printed at 212 and 214. A bit-mapped graphic or logo representative of the intended retailer and, if requested, a retailer control code are retrieved from nonvolatile memory device 28 and printed to location 216 of certificate 200 during certificate printing. Retailer logos are obtained by scanning a design provided by the retailer and storing the resulting image to nonvolatile memory device 28. Retailer logos are among the sensitive data destroyed when security is breached as described above.

Purchasers receive certificate 200, remove section 202 for their records and send sections 204 and 206 to the intended recipient. The recipient receives sections 204 and 206, detaches 204 from 206 and redeems section 206 at the designated store.

Gift certificates are stored in a bonded printer. Only bonded authorized service personnel can obtain paper and install it in the printer. Supplies of paper in each device 10 are checked randomly for integrity.

The value of a certificate 200 cannot exceed a predetermined amount. In the preferred embodiment that amount is $100. In addition, each device 10 monitors use of each credit card and prevents charging more than a predetermined limit in a designated time period. In networked systems this protection against credit card abuse can extended to all gift certificate dispensing devices 10 in the network.

Each certificate is printed with an expiration date to encourage timely redemption. To further enhance security, participating stores are requested to redeem certificates for merchandise only and to request identification while redeeming a certificate.

Operation of computer 24 will be described next. On receiving power, computer 24 executes a power-on self test. In a PC compatible computer this test is a resident program that is typically executed out of ROM (read only memory). The power-on self test checks system dynamic memory, the system board, nonvolatile memory device 28 and monitor 12. Upon successful completion, computer 24 reads up a portion of its programming from nonvolatile memory device 30 and begins executing a system initialization program. If computer 24 is unable to successfully complete the power-up self test, a message to that effect is displayed on monitor 12 and gift certificate dispensing device 10 is disabled.

Figure 5A:
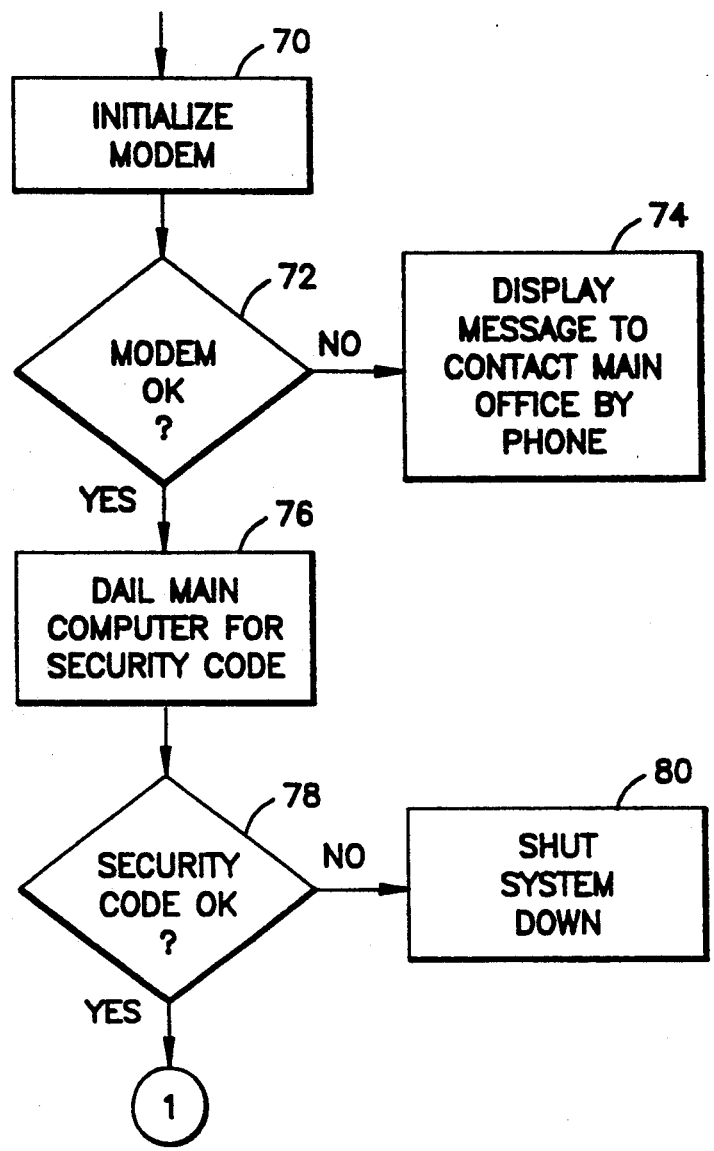
FIGS. 5a and 5b are flow chart representations of the steps taken in initializing the gift certificate dispensing device computer upon power up.
Figure 5B:
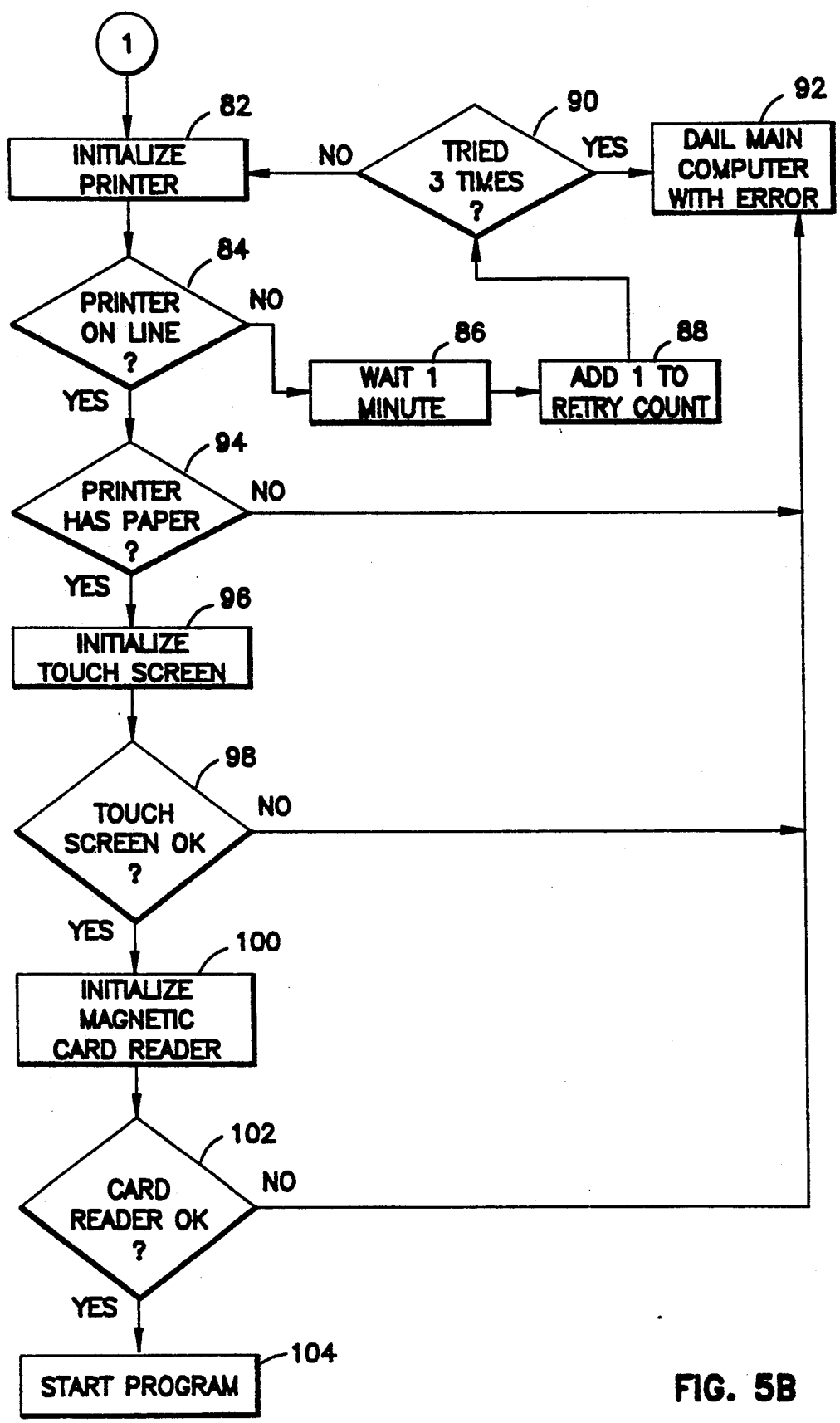

A control flow program representative of a system initialization for the present invention is illustrated in FIGS. 5a and 5b. The routine shown is written for a networked environment. It should be obvious to one skilled in the art that this routine is readily adaptable to independent operation of a gift certificate dispensing device.

The routine is entered at 70 after successful execution of the power-on self test. First, communication is established with main computer 60. At 70 an attempt is made to initialize modem 42. At 72 a check is made to see if the modem is ready. If not, at 74 a message is displayed on monitor 12 detailing the error and requesting service.

If at 72 the modem is found to be ready, at 76 a telephone call is made to main computer 60 and a security code downloaded from computer 60 to computer 24. At 78, the downloaded security code is compared against a code stored on nonvolatile memory device 28. If the two codes match, node security has been verified. Retry count is set to zero and control moves to 82 to initialize laser printer 26. If the two codes do not match, a system shutdown routine is called at 80 to secure the gift certificate dispensing device.

After link security has been verified at 78, at 82 an attempt is made to initialize printer 26. A check is made at 84 to see if printer 26 is ready. If not, at 86 computer 24 executes a one minute wait, at 88 the retry count is incremented and at 90 a check is made to see if the number of initialization attempts equals three. If so, at 92 a telephone call is placed through modem 42 to main computer 60 and the error is logged.

If at 84 printer 26 is determined to be ready, a check is made at 94 to see if printer 26 has blank certificates. If not, control moves to 92, a telephone call is placed through modem 42 to main computer 60 and the error is logged.

If at 94 printer 26 is determined to have a supply of blank certificates, control moves to 96 where touch screen 14 is initialized. At 98 a check is made to see if touch screen 14 is ready. If not, control moves to 92 to log the error. If touch screen 14 is ready, at 100 card reader 16 is initialized and at 102 a check made to see if card reader 16 is ready. If not, control moves to 92 to log the error. If card reader 16 is ready, at 104 the main program is initiated.

On successful completion of the initialization program of FIGS. 5a and 5b, computer 24 enters the main program. The main program will now be described from the standpoint of the user interface.

Figure 9:
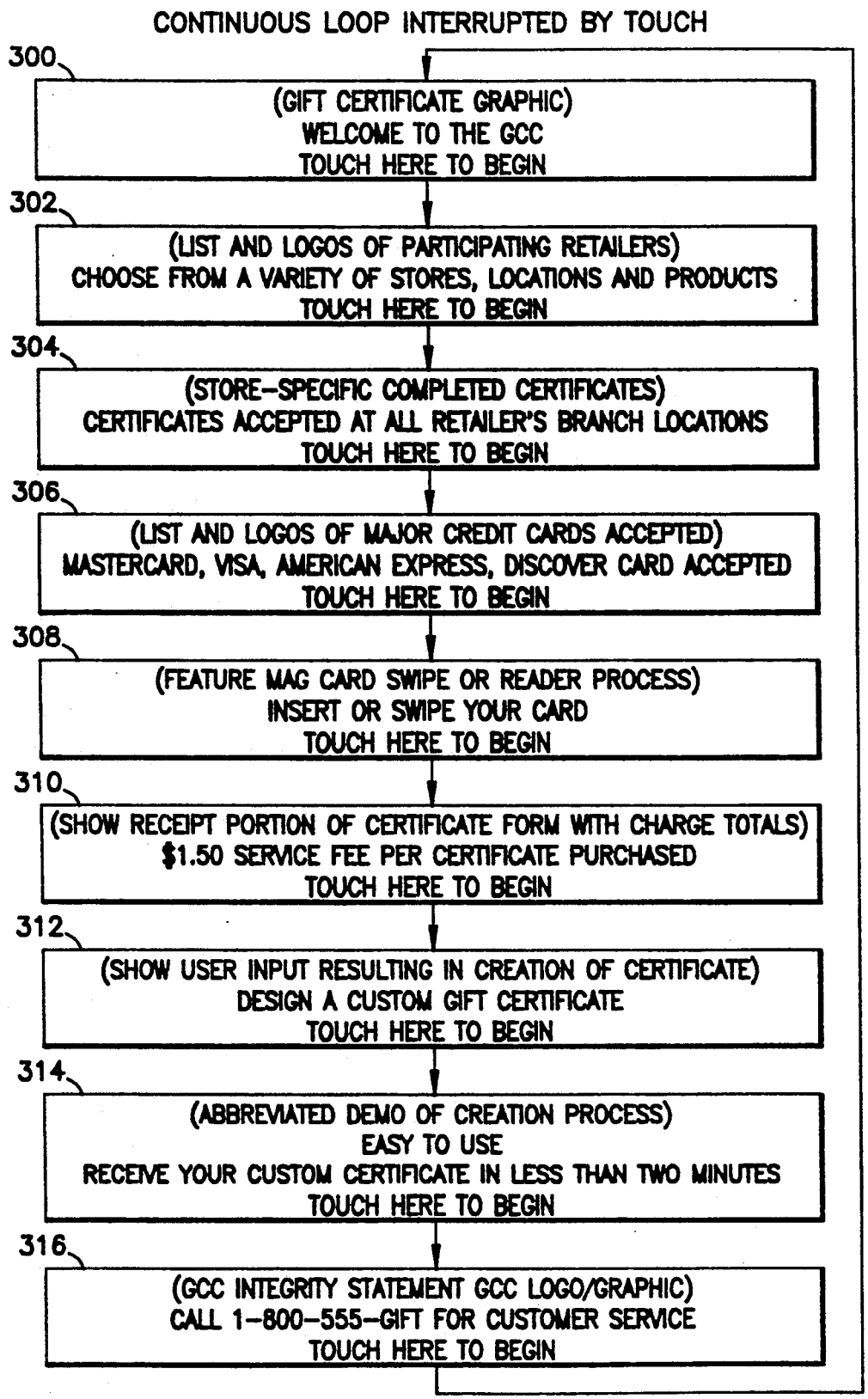
FIG. 9 illustrates a series of representations of the screen images that are displayed according to the present invention to attract consumer attention and to explain the operation of the gift certificate dispensing device.

The main program starts with the Attractor module shown in FIG. 9. The Attractor module is an endless loop during which a sequence of display screens is shown on monitor 12. The sequence of display screens is intended to familiarize the consumer with the gift certificate product itself and with the method used to purchase a gift certificate. The loop is terminated by the detection of a touch on touch screen 14. FIG. 9 shows a representative sequence of display screens used while waiting for the touch on touch screen 14. At 300 a welcome screen is displayed. At 302, a list of participating retailers is displayed. At 304, some examples of completed gift certificates are shown. At 306, a list of the types of credit cards that can be used is displayed. At 308, instructions on use of magnetic card reader 16 are displayed. At 310, transaction charges are explained. At 312, an animated graphic demonstrating design of a custom gift certificate is displayed. At 314, an animated graphic illustrating the printing and dispensing of a gift certificate is displayed. And at 316, a graphic describing the company that owns the particular gift certificate dispensing device is displayed (in this case the company is THE GIFT CERTIFICATE CENTER, INC. or GCC). The routine continues scrolling through screens 300 through 316 until a touch is detected on touch screen 14.

Figure 10A:
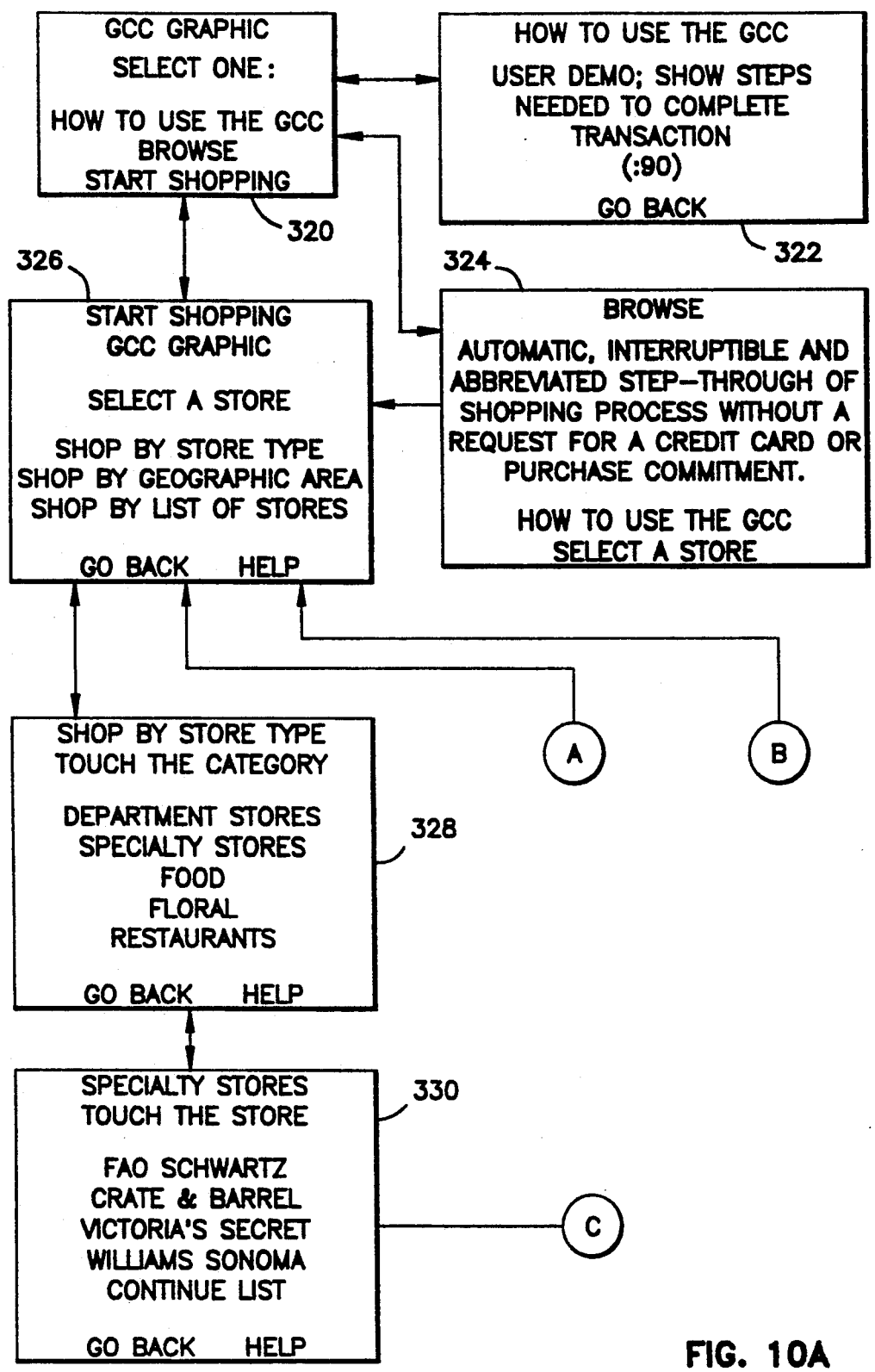
FIG. 10a is a flow chart representation of the screens that are displayed as a consumer selects a retailer according to the present invention.
Figure 10A:
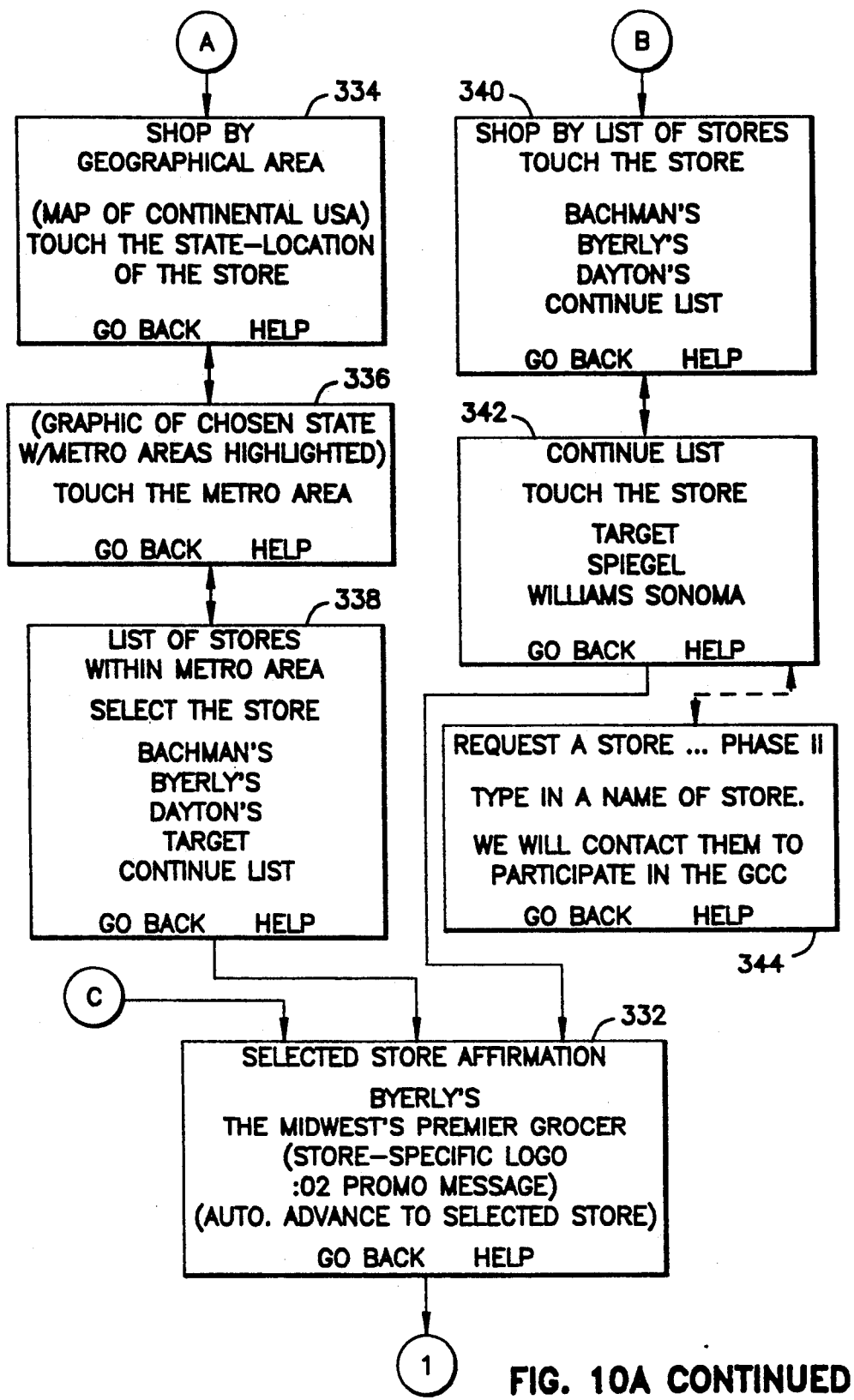

Once a touch is detected, control moves to the routine shown in FIG. 10a. FIG. 10a illustrates the sequence of screen displays shown while choosing the retailer to be shown on the purchased gift certificate. The routine is entered at 320 where a screen is displayed with clearly marked areas labeled "How to use the GCC", "Browse" and "Start Shopping". Computer 24 then waits for a selection made by touching within the marked areas on touch screen 14. At 320, as in the remaining screens of FIGS. 10a through 10c, if no touch is detected within ten seconds a prompt such as "Please touch the screen to continue" is displayed on monitor 12. Another fifteen seconds is allowed to pass. If no touch is detected yet, a prompt such as "Please make your selection now" is displayed. Then if no touch is detected within the next forty-five seconds, control reverts to the Attractor module shown in FIG. 9.

If, at 320, the area labeled "How to use the GCC" is touched, control moves to 322 where a short demonstration of the steps needed to complete the purchase of a gift certificate is shown. At any time during that demonstration a touch on the area of the screen marked "Go Back" will terminate the demonstration display and move control back to 320. In any event, after the demonstration concludes, control moves back to 320.

If, at 320, the area labeled "Browse" is touched, control moves to 324 where an abbreviated step-through of the demonstration of 322 is shown. At any time during the step-through a touch on the area of the screen marked "How to Use the GCC" will terminate the demonstration display and control will move to 322. A touch on the area marked "Select a Store" will move control to 326. In any event, after the demonstration concludes, control moves back to 320.

If, at 320, the area labeled "Start Shopping" is touched, control moves to 326 where a screen is displayed with clearly marked areas labeled "Shop by Store Type", "Shop by Geographic Area", "Shop by List of Stores", "Go Back" and "Help. The merchant named on the gift certificate can be chosen by category, by geographical locations served or from a list of retailers who serve the local area. The "Go Back" label is provided on a majority of screens to allow users to retrace their steps through the screen displays. The "Help" label is provided to call a series of "Help" screens (not shown) for additional instructions.

If, at 326, the area labeled "Shop by Store Type" is touched, control moves to 328 where a screen is displayed with clearly marked areas labeled by category. A touch within one of the marked areas moves control to 330 where a list of stores within that category is displayed. A touch on a retailer from the list of stores in 330 moves control to 332 where a short store-specific promotional message is displayed and then to 346.

If, at 326, the area labeled "Shop by Geographic Location" is touched, control moves to 334 where a map of the states of the continental United States is displayed. A touch within one of the states moves control to 336 where a graphical representation of the state is displayed with metropolitan areas highlighted. A touch in an area highlighted as a metropolitan area moves control to 338 where a list of the stores that serve that metropolitan area is displayed. The stores listed may be stores located in that area or stores that provide a mail-order service for that area. The list is displayed such that a touch on touch screen 14 in the vicinity of a retailer on the list selects the retailer and moves control first to 332 where a short store-specific promotional message is displayed and then to 346.

If, at 326, the area labeled "Shop by List of Stores" is touched, control moves to 340 where a screen is displayed with list of stores that serve the immediate metropolitan area. When the list is too large to fit on one display screen the consumer can scroll down the list by touching the area marked "Continue List" and moving to 342. At 342, the consumer can also scroll back up the list (and move back to 340) with the "Go Back" command. A touch within the vicinity of one of the stores on the list in either 340 or 342 selects the store. Control moves to 332 for the display of a short promotional message related to the selected store prior to moving to 346.

In an alternate embodiment, a screen display 344 is provided to provide customer feedback. The screen displays of 340 and 342 would include a marked area labeled "Request a Store". A touch in the vicinity of "Request a Store" causes the program to move to 344 where the customer can enter the name of the desired store through touch screen 14 using a keyboard displayed on monitor 12. Computer 24 registers the store requested for later market analysis and then control moves back to either 340 or 342 so the customer can select a listed store.

Figure 10B:
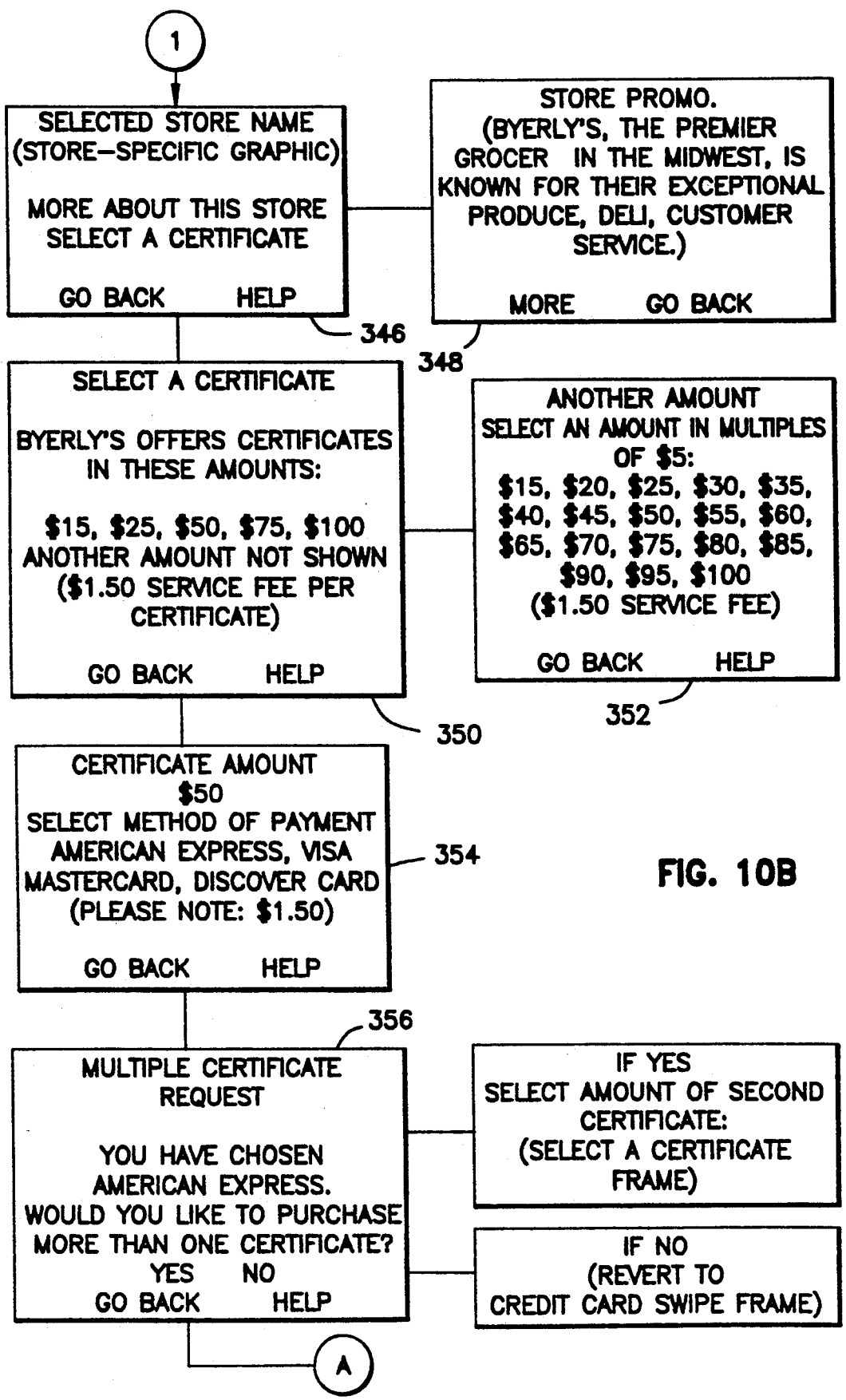
FIGS. 10b and 10c are flow chart representations of the screens that are displayed as a consumer selects a gift certificate for a previously selected store according to the present invention.
Figure 10B:
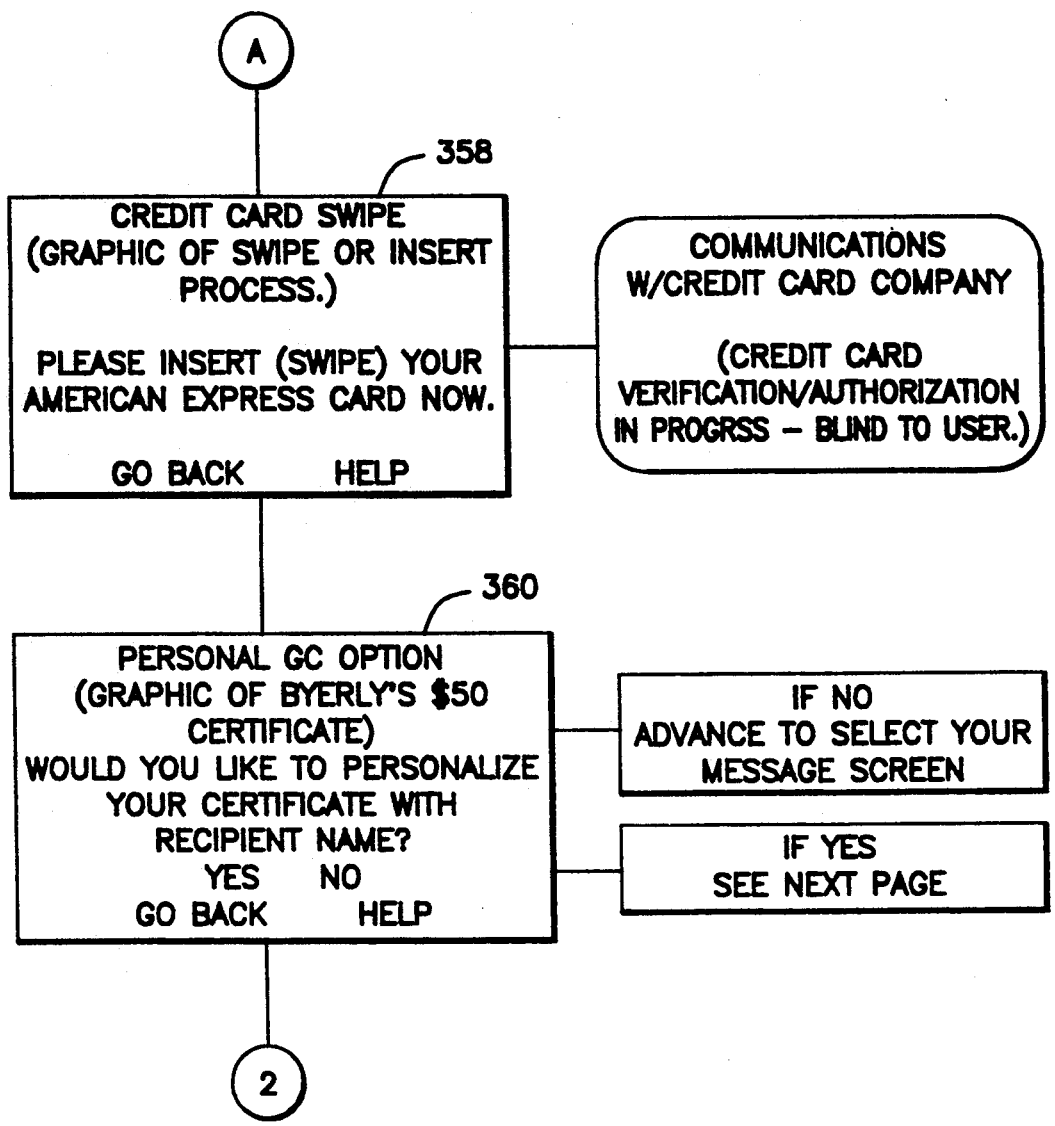

Once a store has been selected control moves to 346 as shown in FIG. 10b to complete the purchase. At 346 a screen is displayed with clearly marked areas labeled "More about this Store" and "Select a Certificate". Computer 24 then waits for a selection made by touching within the marked areas on touch screen 14. Selection of the area marked "More about this Store" takes the program to 348 where a longer promotional message related to the selected store is displayed. This message may include information on products and services and on current sales promotions. In the preferred embodiment, on conclusion of the promotional message control moves back to 346.

If, at 346, touch screen 14 is touched in the area marked "Select a Certificate", control moves to 350. At 350 a screen is displayed listing the types of certificates offered by the selected store. In the preferred embodiment, certificates can be issued for goods, services or monetary value. The item chosen is printed as text or as a graphical representation of that item to section 206 of certificate 200 in FIG. 12. Since more than one certificate can be purchased at one time, a separate window is displayed on monitor 12 showing charges accumulated so far in the transaction. The customer chooses the type of certificate desired by touching in the vicinity of a label from a group of labels including monetary values and available goods and services. If the desired monetary values are not displayed, the customer can select the label marked "Another amount not shown". Control then moves to 352 and other values can be selected. Once a value is selected at 350 or 352, control moves to 354 in order to charge the purchase to a credit card.

At 354 a list of accepted credit cards is displayed. The customer selects the form of payment and at 356 computer 24 displays the form of payment selected and the question "Would you like to purchase more than one certificate?". If at 356 the answer is "Yes", the data corresponding to the previous certificate selected is saved and control moves to 350 so that additional certificates can be purchased. If the answer is "No", control moves to 358.

Figure 8:
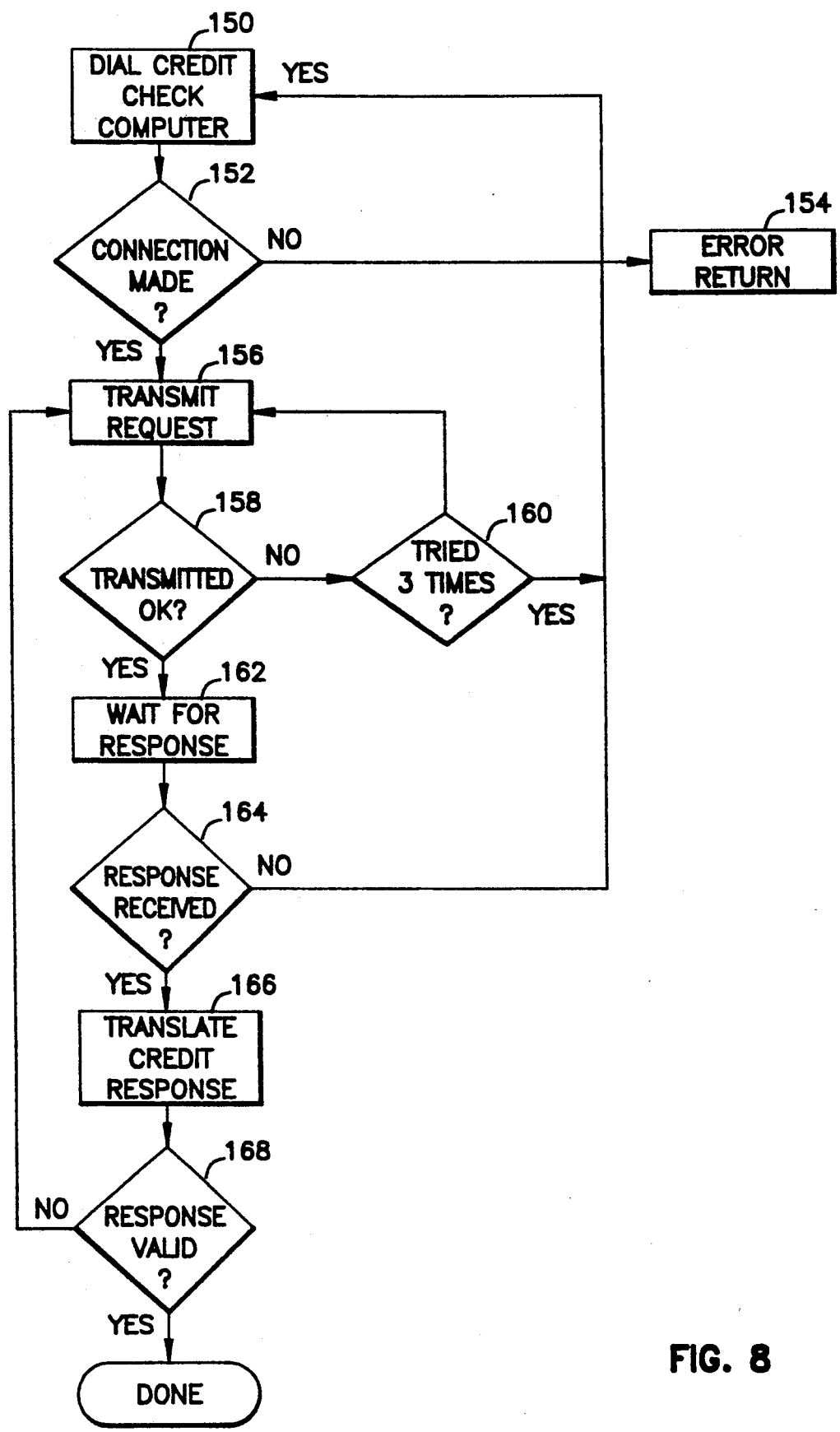
FIG. 8 is a flow chart representation of the steps taken in validating a credit card with a credit authorization computer.

At 358 a graphic is displayed showing the process of inserting or swiping a credit card. Card reader 16 notifies computer 24 that a card has been swiped and transfers the data encoded in the magnetic strip of the card. Computer 24 then initiates a call to credit authorization computer 62 for card validation as shown in FIG. 8 and explained below. Card validation is required before a certificate can be printed. In the preferred embodiment, card validation is handled as a separate, independent task. If a negative credit report is received from computer 62, at the next screen transition control moves to 354 where a list of forms of payment is again displayed and an opportunity is offered for the use of a different form of payment.

While the call is being made to computer 62, control moves to 360 where a request is displayed for the intended recipient's name. The customer touches "Yes" to indicate a name will be entered and control moves to 362. If "No" is selected control moves to 370 where a personal message can be entered on each certificate.

Figure 10C:
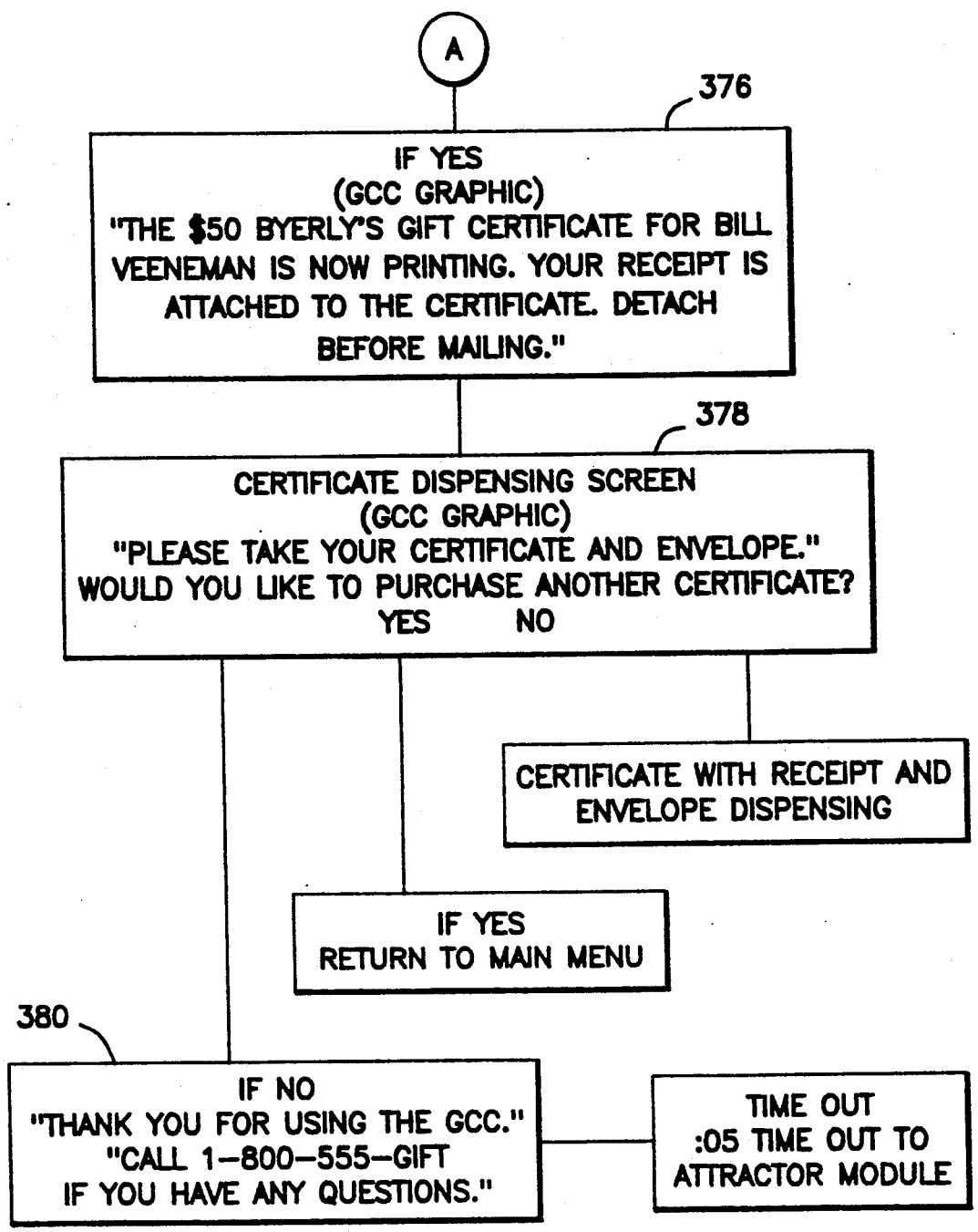

At 362 as shown in FIG. 10c the customer can enter the name of the intended recipient through touch screen 14 using a keyboard displayed on monitor 12. The typed name is then displayed at 364 in a graphic of the completed gift certificate with the name inserted. The screen display at 364 also displays the question "Is this correct?" and the labels "Yes" and "No". If a "No" is selected control moves to 362 to reenter the name.

In an alternate embodiment, the customer can enter the name and address of the recipient at 362 and an envelope is printed bearing the address of the recipient.

If a "Yes" is selected at 364 control moves to 366 where a screen is displayed providing the opportunity to enter either a prepared message or a custom greeting. Selection of a prepared message is done by touching in the vicinity of the message displayed. Control then moves to 370. Selection of a custom message is done by touching the "Custom Message" label displayed on the screen of 366.

If a custom message is selected at 366, control moves to 368 where a keyboard is displayed for entering a custom message. When the message is completed control moves to 370 where a representation of certificate 200 is displayed along with the question "Is this correct?" and the labels "Yes" and "No". If the answer is "No" control moves to 372 where certificate 200 is displayed again along with the labels "Amount", "Message" and "Recipient Name". If "Amount" is selected control moves to 350 to change the type of certificate. If "Message" is selected control moves to 366 to change the message. If "Recipient Name" is selected control moves to 360 to change or delete the recipient's name.

If, at 370, the certificate is deemed to be completed correctly the customer selects "Yes". If the card validation call has been completed and the charges authorized control moves to 376. If the card validation call has not been completed control moves to 374 and a screen is displayed showing that the credit check is still in progress. Control remains at 374 until the card validation call to computer 62 is completed. When the call is completed, if credit was not authorized, a message to that effect is displayed and control moves 354. If credit was authorized control moves to 376.

At 376 the gift certificate is printed while the screen displays an appropriate message. Control then moves to 378 where an envelope is dispensed and an offer extended to purchase another certificate. If the answer is "Yes" control moves to 326. If "No" control moves to 380 where a brief "thank you" message is displayed before control moves back to 300 of the Attractor module of FIG. 9.

Figure 11:
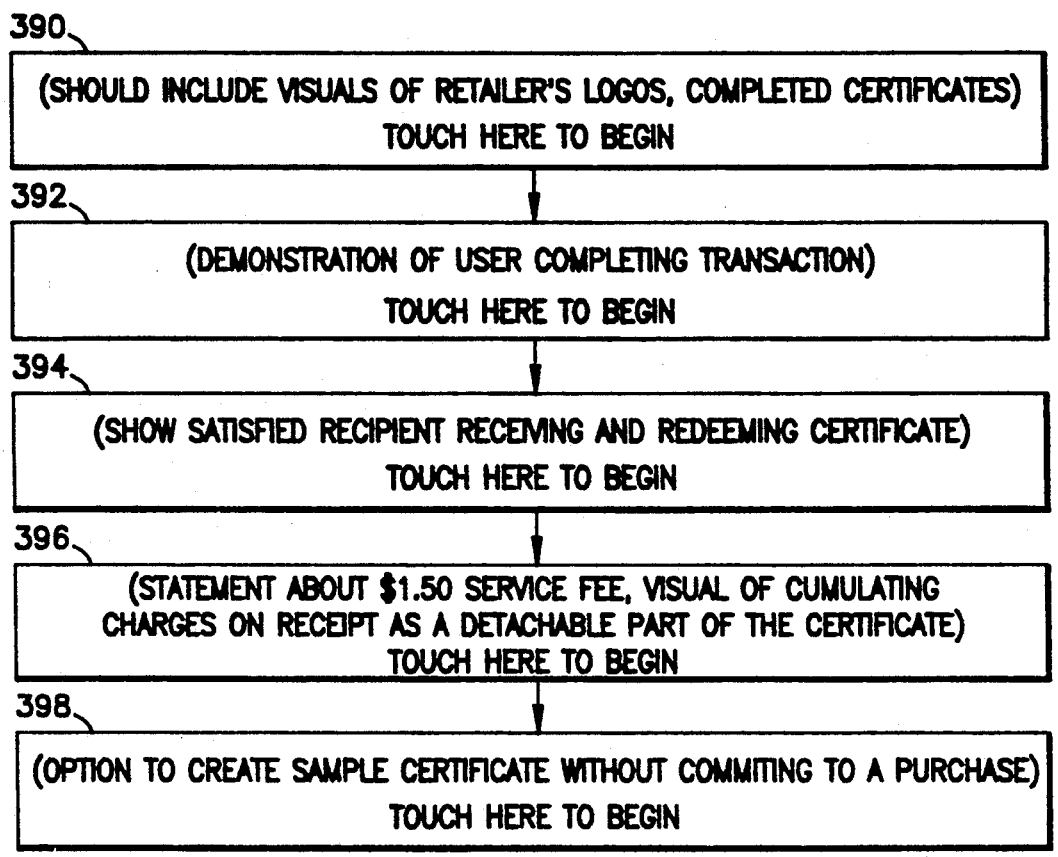
FIG. 11 is a flow chart representation of the screens that are displayed as a response to a customer selecting the BROWSE option during the "Select a Store" phase according to the present invention.

FIG. 11 illustrates the preferred embodiment of the "Browse" routine shown as 324 in FIG. 10a. The "Browse routine is entered at 390 where a series of visuals is displayed of retailer's logos and completed certificates. At 392 a short demonstration of a user purchasing a gift certificate is displayed. At 394 a graphic is displayed of a satisfied customer receiving a certificate. At 396 a statement listing the charges for purchasing a certificate is displayed along with a graphic demonstrating accumulation of charges on the receipt section of a completed gift certificate. And at 398 the customer is invited to create and display (but not print) a sample certificate. Control then moves back to the calling routine.

A series of routines used to perform functions within the main program are described next. A system shutdown routine used to secure a gift certificate dispensing device 10 is illustrated in FIG. 6. The routine is entered at 110 where computer 24 initiates display of an "Out of Order" screen on monitor 12. At 112 touch screen 14 is disabled and at 114, a call is placed through modem 42 to main computer 60 to log the reason for system shut down.

Figure 7:
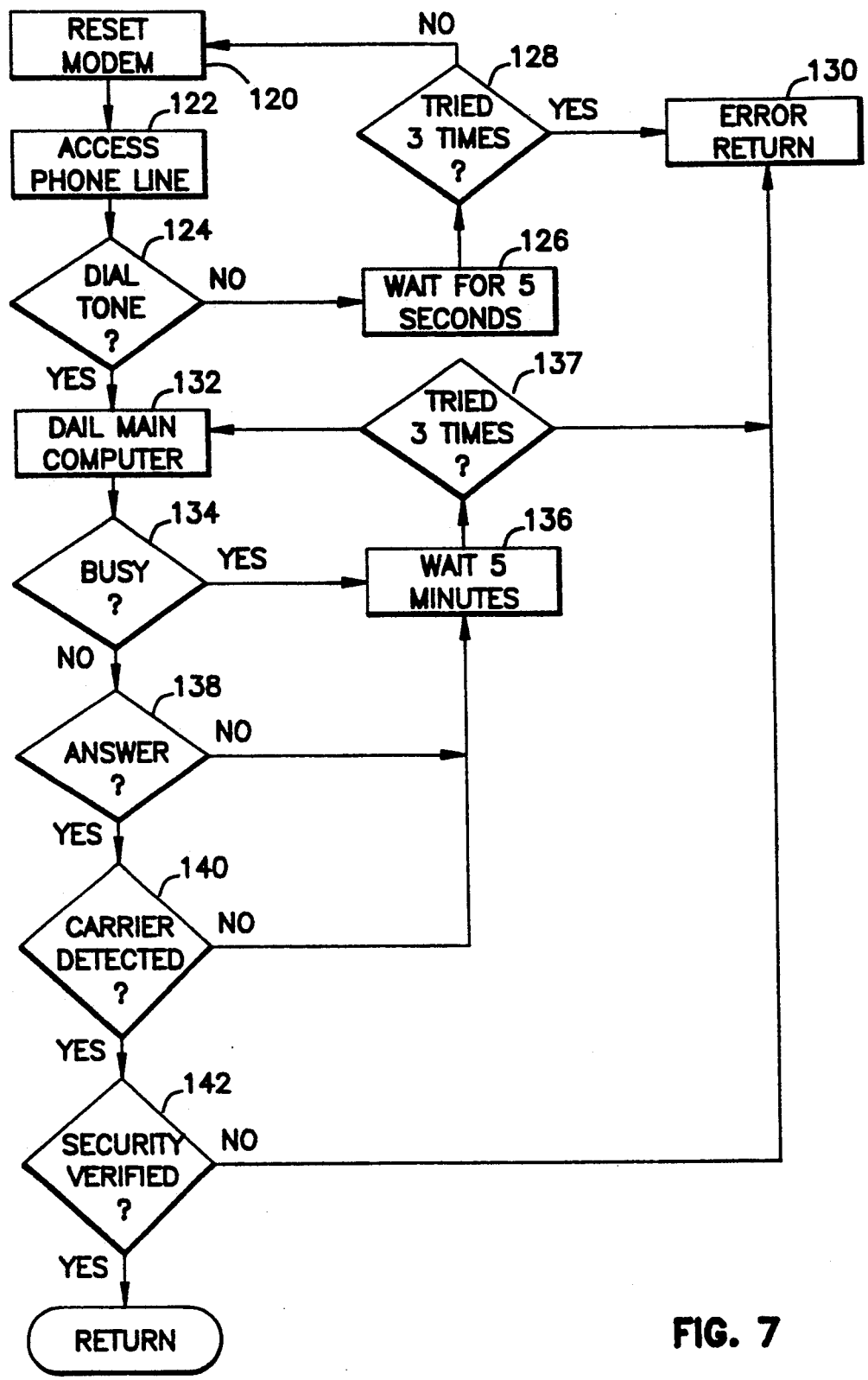
FIG. 7 is a flow chart representation of the steps taken in initiating a call to an external computer system.

A routine used to initiate a call to main computer 60 or credit card authorization computer 62 is shown in FIG. 7. For the sake of brevity the routine will be described for a call to computer 60. It should be obvious to one skilled in the art that this routine can be used to initiate a call to any external computer through modem 42. Also, this routine is used to set up the call; the calling routine takes over communicating to the external computer and terminates the call when ended. The routine is entered at 120 where modem 42 is set to a known condition. At 122 an attempt is made to access public telecommunications channel 46. At 124 computer 24 checks for a dial tone at modem 42. If a dial tone is not found, at 126 computer 24 increments the retry count, executes a program to wait for five seconds and checks to see at 128 if that was the third time a dial tone was not detected. If so, control moves to 130 and an error status is returned to the calling routine. If not, control moves to 120, modem 42 is again reset and the routine continues.

If a dial tone is found at 124, at 132 computer 24 commands modem 42 to dial computer 60. If at 134 a busy tone is detected, at 136 computer 24 initiates a program to wait five minutes and move to 137. If at 137 it is determined that this is the third failure, control moves to 130 and an error status is returned to the calling routine. If not, control moves to 132 to try the call again. If at 138 there is no answer after a predetermined number of rings or at 140 an off-hook is detected without a carrier, control moves to 136 to wait before trying again.

If a carrier is detected at 140, at 142 a security routine associated with computer 60 is executed. If the proper handshake is not consummated, control moves to 130 and an error status is returned to the calling routine. If security has been verified with the correct handshaking, control moves back to the calling routine to complete the call.

A routine used to validate a credit card swiped through card reader 16 is shown in FIG. 8. This routine is entered at 150 where a call is made to the routine shown in FIG. 7 to initiate the call. The routine shown in FIG. 7 returns with either a normal or an error status. If an error status is returned, at 152 control moves to 154 and an error status is returned to the routine that initiated the credit card validation routine.

If a normal status is returned on call initialization, at 152 control moves to 156 and a credit card validation request is transmitted to computer 62. If at 158, it is determined that the request was not transmitted correctly, at 160 a check is made to see if this is the third failure and, if not, control returns to 156 to try again. If at 160 it is determined that this is the third failure, control returns to 150 to initiate the call again.

If at 158 it is determined that the request was transmitted correctly, at 162 computer 24 waits a predetermined time period for a response. If the response is not received in that period of time at 164 control moves to 150 to initiate the call again.

If at 162 a response is received before expiration of the predetermined time period at 164 control moves to 166 where the response is translated into a format used by the program. At 168 the translated response is checked for validity. If the response is a valid response, control returns to the calling routine. If the response is not valid, control returns to 156 and the request is transmitted again.

To use the present invention, the customer walks up to gift certificate dispensing device 10 and touches touch screen 14. The customer then selects a store from a list of local merchants or obtains a different list of merchants sorted by category or geographical area served. The customer next enters the type of credit card that will be used to purchase the gift certificate and swipes that card through card reader 16. While gift certificate dispensing device 10 is obtaining credit card authorization, the customer enters the name of the recipient of the card and chooses a personal message.

An image of the certificate with the name of the recipient and the personal message included is displayed for verification. If the certificate looks right the customer initiates printing of the certificate and, if the credit purchase was authorized, a gift certificate 200 is printed and dispensed through slot 18. At the same time an envelope is dispensed through slot 20.

The customer detaches section 202 from certificate 200 as a receipt for his records. The remaining certificate is folded at the intersection of sections 204 and 206, inserted in the envelope and mailed or given to the intended recipient. The charges detailed in section 202 are applied against the customer's charge account and appear sometime later in a normal credit card billing statement.

Although the present invention has been described with reference to the preferred embodiments, those skilled in the art will recognize that changes may be made in form and detail without departing from the spirit and scope of the invention.

What is claimed is:

1. Gift certificate dispensing apparatus responsive to a user wielding a planar card having magnetic coded data representing account name and account number disposed thereon, comprising:
 a housing:
 a card reader for reading magnetic coded data disposed on said planar card and for providing an output signal representative of said coded data, said reader being supported by said housing;
 a certificate having first, second, and third sections, adjacent of said sections being separable along a weakened line;
 means, supported by said housing, for printing on and dispensing said certificates; and
 control means under user control connected to said card reader and said printing and dispensing means for receiving and verifying said output signal and controlling the printing and dispensing of certificates from said printing and dispensing means, said control means including first means for receiving from said user a gift amount and preparing for printing said gift amount on said first section of said certificate, said control means further including account name, account number, and cost of transaction on said second section of said certificate, said control means still further including third means for receiving from said user a greeting and preparing for printing said greeting on said third section of said certificate, said control means obtaining said cost of transaction from said gift amount, said control means still further including means, on verification of said output signal and on command by said user, for initiating printing by said printing and dispensing means of said first, second, and third sections of said gift certificate and dispensing said gift certificate,
 wherein said user can separate as a receipt said second section from said first and third sections and can give said first and third sections representing a gift certificate and a greeting-type message to another person, said another person being able to retain said third section as a remembrance and cash in said first section purveyor for a gift.

2. The apparatus of claim 1 wherein the control means includes a programmable first computer, connected to said card reader and said printing and dispensing means, for verifying under program control the coded data received from said card reader and for controlling and monitoring the printing and dispensing of said certificate.

3. The apparatus of claim 2 wherein the control means further includes a second computer and communication means connected to said programmable first computer for communicating with said second computer in order to verify said coded data.

4. The apparatus of claim 2 wherein said first receiving and preparing means includes means for said user to select a purveyor for said gift and wherein the control means includes nonvolatile data storage means connected to said programmable first computer including means for storing graphics representative of said purveyor for printing by said printing and dispensing means on said certificate.

5. The apparatus of claim 1 wherein said control means further includes user interface means for user selection of options in certificate printing and dispensing.

6. The apparatus of claim 5 wherein said user interface means includes a monitor and a touch screen mounted on said monitor for selecting from options displayed on the monitor.

7. The apparatus of claim 1 further comprising envelope dispenser means connected to said control means for dispensing an envelope for said certificate.

8. Apparatus in accordance with claim 1 wherein said control means also includes fourth means for receiving from said user a purveyor name and preparing for printing said purveyor name on said first section of said certificate.

9. Gift certificate dispensing apparatus responsive to a user wielding a planar credit card having magnetic coded data disposed thereon, comprising:
 a certificate having sections with a series of perforations marking an intersection between a pair of said sections, said certificate having a bar code thereon;
 a card reader for reading magnetic coded data disposed on said planar credit card and for providing a first output signal representing account name and account number;
 certificate dispensing means for dispensing said certificate;
 means for scanning said bar code to create a second output signal;
 a programmable computer under user control connected to said card reader and said dispensing means, said computer including program means for reading said first and second output signals, said computer including means for receiving from said user a gift amount, said program means providing for calculating a cost of transaction from said gift amount, said dispensing means including and said program means of said computer controlling first means for printing on a first section said gift amount and second means for printing on a second section said account name, said account number, and said cost of transaction, said program means also including means for associating said bar code with said transaction;

wherein said first section as printed with said printing means and in combination with said bar code constitutes a medium for subsequent commercial usage, and wherein said second section is a user receipt.

10. A method of printing, under user control, from an electronic certificate dispenser, certificates to be used for obtaining goods or services, wherein said electronic certificate dispenser includes display means, card reader means, user interface means and printing and dispensing means, said method comprising:

displaying on said display means a menu of categories of retailers of goods and services;

receiving from said user through said user interface means a choice of one of said categories of said retailers;

displaying on said display means a menu of retailers from said chosen category;

receiving from said user through said user interface means a choice of one of said retailers;

displaying on said display means a series of monetary values;

receiving from said user through said user interface means a choice of one of said monetary values;

after receiving the choice of retailer and monetary value, monitoring the card reader means for the presence of a planar card having magnetic data disposed thereon;

reading said magnetic data with said card reader means;

verifying said planar card is usuable for enabling issuance of a certificate;

communicating from said user interface means to said printing and dispensing means information regarding the retailer and monetary value chosen;

printing with said printing and dispensing means a certificate including the name of the retailer and the monetary value chosen; and dispensing said certificate.

11. The method according to claim 10 wherein the step of printing a certificate includes causing said dispenser to retrieve and print graphics representative of the retailer chosen.

12. The method according to claim 11 wherein the steps of receiving instructions further include receiving instructions including the name of an intended recipient and wherein the step of printing a certificate further includes printing the name of the recipient.

13. The method according to claim 12 wherein the steps of receiving instructions further include receiving instructions including a personal message to the intended recipient and wherein the step of printing a certificate further includes printing said personal message.

14. The method according to claim 10 wherein the method further comprises dispensing an envelope for said certificate.

* * * * *

UNITED STATES PATENT AND TRADEMARK OFFICE
CERTIFICATE OF CORRECTION

PATENT NO. : 5,243,174

DATED : September 7, 1993

INVENTOR(S) : William J. Veeneman et al.

It is certified that error appears in the above-identified patent and that said Letters Patent is hereby corrected as shown below:

Column 2, line 13, after "make", delete "10".

Column 4, line 31, replace "And telephone" with--Telephone--.

Column 4, line 55, after "In" delete "an".

Column 7, line 18, after "can" insert--be--.

Column 11, line 38, after "moves" insert--to--.

Column 11, line 45, replace "thank you" with--Thank You--.

Column 13, line 48, replace "certificates" with--certificate--.

Column 13, line 57, after "including" insert--second means for preparing for printing a receipt including--.

UNITED STATES PATENT AND TRADEMARK OFFICE
CERTIFICATE OF CORRECTION

PATENT NO. : 5,243,174
DATED : September 7, 1993
INVENTOR(S) : William J. Veeneman et al It is certified that error appears in the above-indentified patent and that said Letters Patent is hereby corrected as shown below:

Column 14, line 9, after "section" delete "purveyor".

Signed and Sealed this

Nineteenth Day of April, 1994

Attest:

BRUCE LEHMAN

*Attesting Officer*  *Commissioner of Patents and Trademarks*